(12) United States Patent
Fransen

(10) Patent No.: US 10,110,697 B2
(45) Date of Patent: Oct. 23, 2018

(54) ENVIRONMENTAL DETECTION OF INTERNET OF THINGS DEVICES

(71) Applicant: ADOBE SYSTEMS INCORPORATED, San Jose, CA (US)

(72) Inventor: Peter Fransen, Soquel, CA (US)

(73) Assignee: Adobe Systems Incorporated, San Jose, CA (US)

( * ) Notice: Subject to any disclaimer, the term of this patent is extended or adjusted under 35 U.S.C. 154(b) by 194 days.

(21) Appl. No.: 14/924,905

(22) Filed: Oct. 28, 2015

(65) Prior Publication Data

US 2017/0126834 A1    May 4, 2017

(51) Int. Cl.
| | | |
|---|---|---|
| *G06F 15/173* | (2006.01) | |
| *H04L 29/08* | (2006.01) | |
| *H04L 12/46* | (2006.01) | |
| *H04W 4/70* | (2018.01) | |
| *H04W 4/02* | (2018.01) | |
| *H04W 4/80* | (2018.01) | |

(52) U.S. Cl.
CPC ........ *H04L 67/303* (2013.01); *H04L 12/4625* (2013.01); *H04L 67/1044* (2013.01); *H04L 67/12* (2013.01); *H04L 67/16* (2013.01); *H04W 4/70* (2018.02); *H04W 4/02* (2013.01); *H04W 4/80* (2018.02)

(58) Field of Classification Search
CPC .... H04L 67/303; H04L 67/1044; H04L 67/12
See application file for complete search history.

(56) References Cited

U.S. PATENT DOCUMENTS

| | | | |
|---|---|---|---|
| 6,269,246 B1 | 7/2001 | Rao | |
| 2015/0169891 A1* | 6/2015 | Hook ................. | G06Q 30/0257 726/29 |
| 2016/0055469 A1* | 2/2016 | Kim ....................... | H04L 41/12 705/21 |
| 2016/0088424 A1* | 3/2016 | Polo ..................... | H04W 4/008 455/41.1 |
| 2016/0182657 A1* | 6/2016 | Mukherjee .............. | H04L 67/22 709/223 |
| 2016/0366586 A1* | 12/2016 | Gross .................... | H04W 12/06 |
| 2017/0034592 A1* | 2/2017 | Ray .................... | G06Q 30/0251 |
| 2017/0053110 A1* | 2/2017 | Wang ...................... | G06F 21/32 |
| 2017/0078295 A1* | 3/2017 | Hwang ................ | H04L 67/141 |
| 2017/0180537 A1* | 6/2017 | Heo .................... | H04M 1/7253 |

\* cited by examiner

*Primary Examiner* — Jonathan A Bui
(74) *Attorney, Agent, or Firm* — Shook, Hardy & Bacon L.L.P.

(57) ABSTRACT

The environment within which IoT devices are operating is determining based on sets of fingerprints collected from the IoT devices. The set of fingerprints for each respective IoT device contains at least one fingerprint corresponding to a sensed IoT device in communication with the respective IoT device. A similarity score is generated for pairs of IoT devices by comparing their respective sets of fingerprints to identify matching fingerprints. The IoT devices are grouped into a common environment based on the similarity scores. In some embodiments, content is provided over one or more communications networks to a user associated with an IoT device based on the IoT device being grouped into the common environment with one or more other IoT devices.

20 Claims, 6 Drawing Sheets

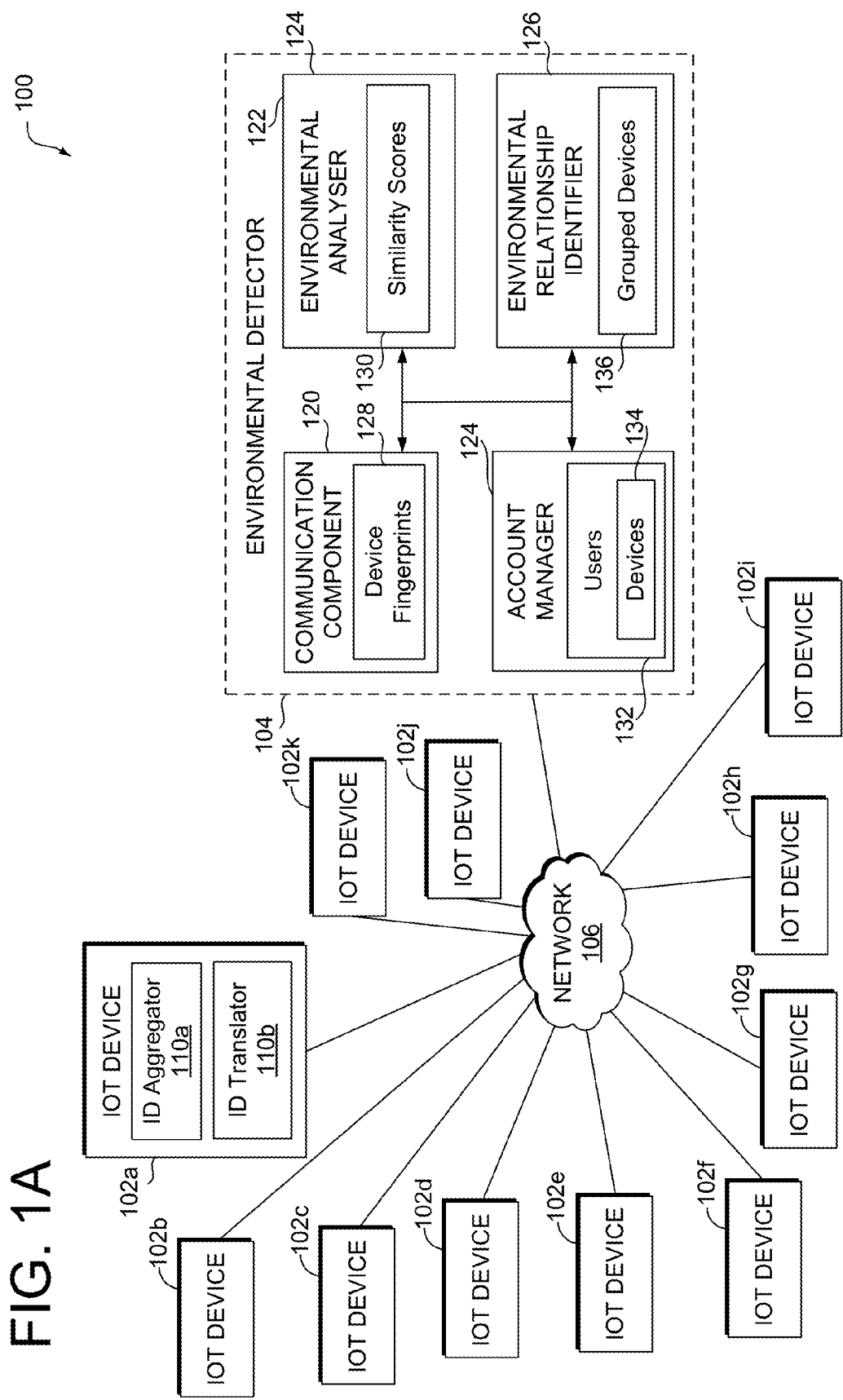

ENVIRONMENTAL DETECTION OF INTERNET OF THINGS DEVICES

BACKGROUND

The Internet of Things (IoT) is often used to refer to a network of physical objects, or "Things," embedded with sensors and electronics that provide network connectivity, enabling the objects to collect and exchange data. These objects can take a variety of forms with widely varying hardware configurations and capabilities. For example, a modern smartphone might be equipped with sensors that enable the capture of physical location, device orientation, light conditions, magnetic fields, acceleration, humidity, and atmospheric pressure. The smartphone may further include the processing power to interpret data from these sensors and communication capabilities compatible with Wi-Fi, cellular, Bluetooth, and Near Field Communication (NFC) technologies. In contrast, an IoT-enabled thermostat might be limited to a temperature sensor and be capable of communicating temperature readings and settings using ZigBee technology.

In order to provide more personalized experiences to users in an IoT world, it would be useful to understand the environment in which IoT devices operate. However, due to the limited capabilities and variable configurations of IoT devices, a challenge arises in understanding the environments of different devices in a consistent way. For example, many approaches to understanding the environment of a device rely upon the device having GPS hardware. While most modern smartphones satisfy this criteria, many IoT devices do not, which can limit the understanding of their environments.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Embodiments of the present invention relate to determining the environment within which IoT devices are operating. In accordance with embodiments of the present invention, sets of fingerprints are received. Each set of fingerprints is assigned to a respective IoT device and contains at least one fingerprint corresponding to a sensed IoT device in communication with the respective IoT device. A similarity score is generated for a first IoT device and a second IoT device by comparing a first set of fingerprints assigned to the first IoT device to a second set of fingerprints assigned to the second IoT device to identify matching fingerprints between the first set and the second set. The first IoT device and the second IoT device are grouped into a common environment based on the similarity score. In some embodiments, content is provided over one or more communications networks to a user associated with the first IoT device based on the first IoT device being grouped into the common environment with the second IoT device.

BRIEF DESCRIPTION OF THE DRAWINGS

The present invention is described in detail below with reference to the attached drawing figures, wherein:

FIGS. 1A-B are diagrams illustrating an exemplary system in accordance with implementations of the present disclosure;

DETAILED DESCRIPTION

Figure 1B:
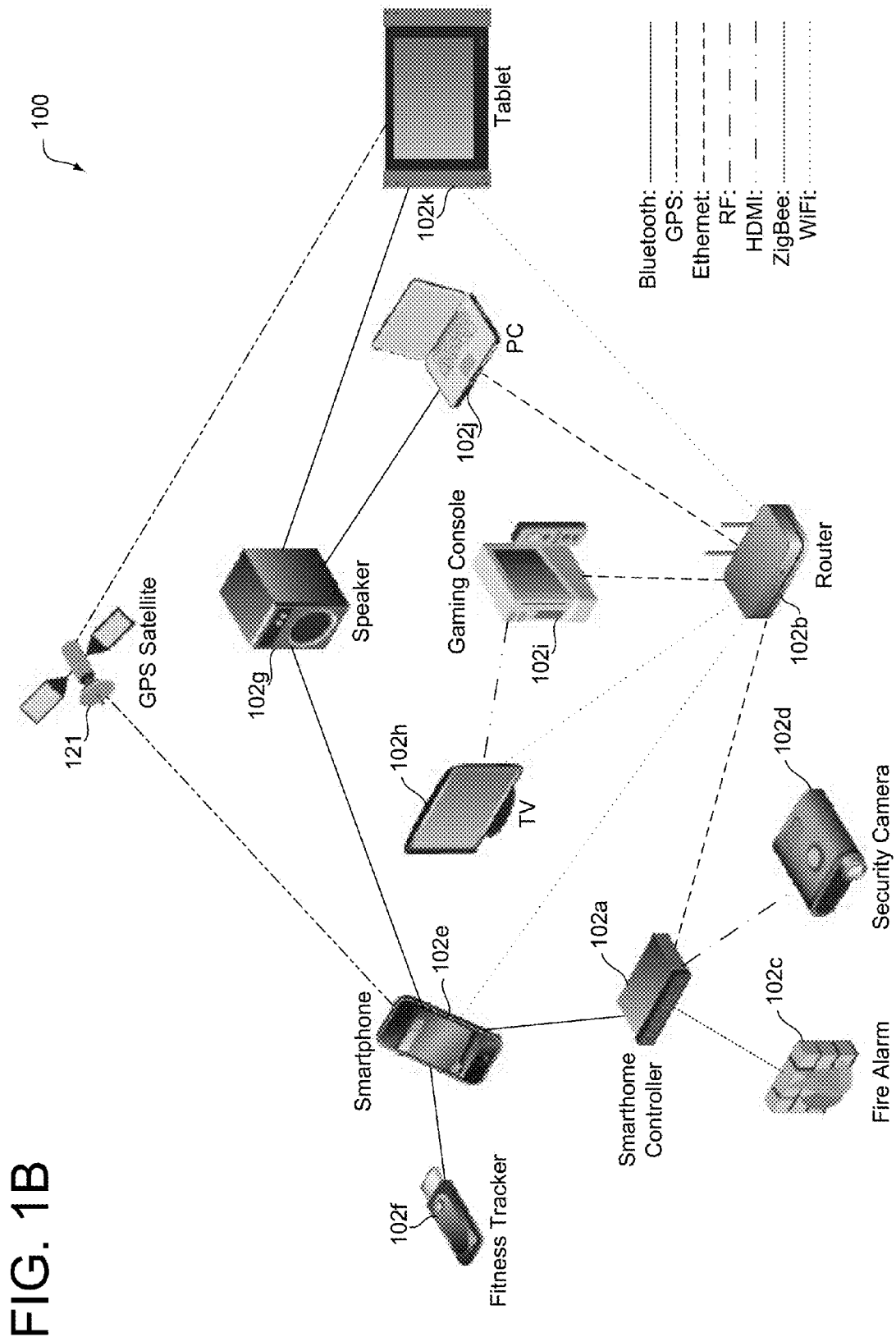

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Various terms are used throughout this description. Definitions of some terms are included below to provide a clearer understanding of the ideas disclosed herein:

As used herein, the term "Internet of Things device" (or "IoT device") refers to any object (e.g., a smarthome controller, router, fire alarm, security camera, smartphone, fitness tracker, speaker, television, gaming console, PC, laptop, tablet, thermostat, furnace, air conditioner, heat pump, hot water heater, light, alarm system, appliance (e.g., refrigerator, oven, stove, dishwasher, washing machine, dryer, microwave oven, etc.), sensor, lawn mower, vehicle, head-mounted display, clothing, etc.) that has an addressable interface (e.g., an Internet protocol (IP) address, a Bluetooth identifier (ID), a near-field communication (NFC) ID, etc.) and can transmit information to one or more other devices over at least one wired and/or wireless connection. An IoT device may have a passive communication interface, such as a quick response (QR) code, a radio-frequency identification (RFID) tag, an NFC tag, or the like, or an active communication interface, such as a modem, a transceiver, a transmitter-receiver, or the like. An IoT device can have a particular set of attributes (e.g., a device state or status, such as whether the IoT device is on or off, open or closed, idle or active, available for task execution or busy, and so on, a cooling or heating function, an environmental monitoring or recording function, a light-emitting function, a sound-emitting function, etc.) that can be embedded in and/or controlled/monitored by a central processing unit (CPU), microprocessor, ASIC, or the like, and configured for connection to an IoT network such as a local ad-hoc network or the Internet.

IoT devices may include, but are not limited to, refrigerators, toasters, ovens, microwaves, freezers, dishwashers, dishes, hand tools, clothes washers, clothes dryers, furnaces, air conditioners, thermostats, televisions, light fixtures, vacuum cleaners, sprinklers, electricity meters, gas meters, etc., so long as the devices are equipped with an addressable communications interface for communicating with the IoT network. IoT devices may also include cell phones, desktop computers, laptop computers, tablet computers, personal digital assistants (PDAs), etc. Accordingly, the IoT network may be comprised of a combination of "legacy" Internet-accessible devices (e.g., laptop or desktop computers, cell phones, etc.) in addition to devices that traditionally have not had Internet-connectivity (e.g., dishwashers, etc.).

A "sensed IoT device" is an IoT device that is sensed by another IoT device through a communication between the two IoT devices. For instance, if one IoT device communicates via the ZigBee protocol to a second IoT device, the first IoT device is sensed by the second IoT device based on the communication, and as such, the first IoT device is a sensed IoT device for the second IoT device. Likewise, the second IoT device may be considered as a sensed IoT device for the first IoT device.

As used herein, an "environment" refers to the surroundings of an IoT device and may include a network environment and physical environment. A "network environment" refers to the collection of IoT devices that communicate with one another via one or more communication networks. For instance, a household may include a number of phones, tablets, PCs, smart TVs, and other devices. At least some of those devices may communicate with each other via wired connections and/or wireless connections (e.g., using the WiFi, Bluetooth, or ZigBee wireless protocols). A "physical environment" refers to the physical surroundings of an IoT device. The likely most common physical environment feature is geolocation (e.g., via GPS sensors). However, other types of physical features may be identified, such as temperature, humidity, light, etc.

An "environmental identifier" refers to information regarding the environment of an IoT device. In some instances, an environmental identifier comprises a device identifier of the IoT device itself or a sensed IoT device. By way of example only and not limitation, this may include an IP address, friendly Bluetooth name, ZigBee address, MAC address, or RF device identifier. The communication interfaces of the IoT device may be polled in order to identify these device identifiers. In some instances, an environmental identifier comprises a physical identifier of the physical environment, such as sensory identifiers extracted by sensors of the IoT device or a sensed IoT device. These can include GPS readings, temperature readings, images, videos, barometric pressure readings, among other things.

A "fingerprint" is used herein to refer to information corresponding to an environmental identifier useable to determine the environment of an IoT device. In some instances, a fingerprint may simply comprise an environmental identifier. In other instances, a fingerprint comprises a hash value computed over an environmental identifier. By way of example only and not limitation, a Secure Hash Algorithm is employed in some embodiments. However, it should be understood that other types of hash functions may be employed to generate a fingerprint in accordance with various embodiments of the present invention.

As the new world of IoT devices continues to emerge, a new need for context information regarding the environment of IoT devices becomes increasingly more important. The knowledge of what kind of environment IoT devices are currently operating is useful in providing a better experience to consumers of the IoT devices. However, complicating this need is the fact that many new types of IoT devices do no collect the data necessary for sufficiently determining the IoT devices' environments. For instance, many IoT devices have only limited functionality and often do not have the ability to determine their own location.

Embodiments of the present invention relate to determining information regarding the environment within which IoT devices are operating. In some implementations, IoT devices each aggregate environmental identifiers (IDs) that are sensed by the IoT device from the environment in which the IoT device operates. The set of environmental identifiers can be captured to form an environmental snapshot of the IoT device. The environmental identifiers include digital identifiers of the environment, such as device identifiers of other IoT devices that are sensed by the IoT device. These can include MAC addresses, Bluetooth friendly names, IP addresses, ZigBee addresses, and more. Device identifiers may be extracted from one or more communications received by the IoT devices from sensed IoT devices. The environmental identifiers may also include physical identifiers of the environment, such as sensory identifiers extracted by sensors of the IoT devices based on the physical environment of the IoT devices. These can include GPS readings, temperature readings, images, videos, barometric pressure readings, and more.

The environmental identifiers for each IoT device are hashed or otherwise provided as fingerprints. Sets of fingerprints from different IoT devices are compared to identify matches between the sets. Based on the matches, the IoT devices are grouped into one or more common environments, such as households. A match between fingerprints can be weighted in the grouping of IoT devices based on the type of fingerprint. For example, matching fingerprints that correspond to a ZigBee address may be weighted higher than those corresponding to an IP address. Using this approach, environments of IoT devices can be determined in a consistent way without requiring particular hardware configurations and capabilities. Thus, content can be personalized to users of these IoT devices based on environmental relationships between the devices, even where the hardware configurations and capabilities of the devices are highly variable.

Turning to FIGS. 1A and 1B, diagrams are provided illustrating an exemplary environmental auditing system 100 (also referred to as "system 100") in accordance with implementations of the present disclosure. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

System 100 is an example of a suitable architecture for implementing certain aspects of the present disclosure. Among other components not shown, system 100 includes any number of IoT devices, such as IoT devices 102*a*, 102*b*, 102*c*, 102*d*, 102*e*, 102*f*, 102*g*, 102*h*, 102*i*, 102*j*, and 102*k* (also referred to as "IoT devices 102"), environmental detector 104, and network 106. It should be understood that any number of IoT devices may be employed within system 100 within the scope of the present disclosure. Additionally, other components not shown may also be included within the system 100.

Although environmental detector 104 is shown as being separate from IoT devices 102, in some implementations, one or more components, and/or functionality of environmental detector 104 can be incorporated into one or more of IoT devices 102. Environmental detector 104 may be implemented as a single device or multiple devices cooperating in a distributed environment. Additionally, other components not shown may also be included within the distributed environment. Each device of system 100 may correspond to computing device 500, later described with reference to FIG. 5, for example, and may communicate with each other via network 106.

Network 106 may be wired, wireless, or both. Network 106 may include multiple networks, or a network of networks, but is shown in simple form in FIG. 1A so as not to obscure aspects of the present disclosure. FIG. 1B shows a specific example of how portions of network 106 may be implemented. By way of example, network 106 can include one or more wide area networks (WANs), one or more local area networks (LANs), one or more public networks, such as the Internet, and/or one or more private networks. Where network 106 includes a wireless telecommunications network, components such as a base station, a communications tower, or even access points (as well as other components) may provide wireless connectivity. Networking environments are commonplace in offices, enterprise-wide computer networks, intranets, and the Internet. Accordingly, network 106 is not described in significant detail.

IoT devices 102 may generally be devices that are readable, recognizable, locatable, addressable, and controllable via an IoT communications network, such as an ad-hoc system. In various implementations, IoT devices 102 are computing devices that are connected to the Internet, such as the World Wide Web. One or more of IoT devices 102 may be capable of directly generating and/or receiving Internet communications. However, it is further contemplated that one or more other devices, such as another IoT device, may generate and/or receive Internet communications on behalf of an IoT device.

Examples of suitable IoT devices 102 have been described above and include a personal computer (PC), a laptop computer, a mobile phone, a tablet computer, a wearable computer, a personal digital assistant (PDA), an MP3 player, a global positioning system (GPS) device, a video player, a digital video recorder (DVR), a cable box, a set-top box, a handheld communications device, a smart phone, a smart watch, a workstation, a television, a speaker, headphones, a security camera, a web camera, a gaming console, a smarthome controller, an appliance, a thermostat, a fire detector, a fitness band, a refrigerator, an oven, any combination of these delineated devices, or any other suitable device.

In some cases, one or more of IoT devices 102 are peripheral devices to one or more other devices. The IoT device may support one or more master-slave protocols and/or short-range communication protocols, such as a Bluetooth based protocol. As another example, an IoT device may support one or more personal area network protocols and/or wireless mesh network protocols, such as a ZigBee based protocol. In some implementations, one or more of IoT devices 102 are sensor nodes, such as motes, that are part of a sensor network. Each mote may be capable of performing processing, gathering sensory information, and communicating with other connected nodes in the network.

FIG. 1B shows some specific examples of IoT devices 102 and configurations thereof for illustrative purposes. However, it will be appreciated that many other devices and configurations are possible. In FIG. 1B, IoT devices 102a, 102e, 102h, 102i, 102j, and 102k are configured to communicate with an access network, such as IoT device 102b (an access point), depicted as a router, over a physical communications interface or layer, which can include one or more air interfaces and/or direct wired connections. An air interface can comply with a wireless Internet protocol (IP), such as IEEE 802.11. The access point can be employed to provide those devices with access to the Internet. Although not shown, one or more IoT devices, such as IoT device 102e may in addition, or instead, access the internet via a cellular network.

Some IoT devices, such as IoT device 102j, depicted as a personal computer (PC), directly connect to the Internet (e.g., over an Ethernet connection or 802.11-based network, such as WiFi). IoT devices 102 may have a direct connection to a modem or router, which, in an example, corresponds to IoT device 102b. As another example, an air interface may be used to connect to an access point. For example, FIG. 1B shows IoT devices 102e, 102h, and 102k as using a WiFi connection. IoT device 102b may be connected to the Internet via, for example, an optical communication system, such as FiOS, a cable modem, a digital subscriber line (DSL) modem, or the like. IoT device 102b may communicate with the IoT devices and the Internet using standard Internet protocols (e.g., TCP/IP). In some cases, the Internet, or another public network, is utilized to facilitate communications between IoT devices and environmental detector 104, such as any of the various communications described herein.

One or more of IoT devices 102 may be in one or more peer-to-peer (P2P) networks with one another. In such a case, IoT devices may communicate with each other directly over a connection. Any suitable communications protocol can be employed, examples of which are shown in FIG. 1B. In a peer-to-peer network, service discovery schemes can multicast the presence of IoT devices, their capabilities, and group membership. The peer-to-peer devices can establish associations and subsequent interactions based on this information.

System 100 can include one or more supervisor devices, such as IoT device 102a, which may also be referred to as an IoT manager or IoT controller. As used herein, an IoT manager, or IoT controller, group owner, or the like, may refer to a physical component, such as an IoT device, or a logical component that provides the same or substantially similar functionality.

In some implementations, a supervisor device generally observes, monitors, controls, and/or otherwise manages various IoT devices in system 100. As examples, IoT device 102a performs these functions with respect to IoT devices 102c and 102d. The supervisor device may communicate with an access network (e.g., IoT device 102b) and/or another IoT device, such as IoT device 102e, to monitor or manage attributes, activities, or other states associated with various IoT devices in the system 100. In some cases, the supervisor device may have a connection to an IoT server (e.g., via the Internet). The supervisor device may obtain information from the Internet, the IoT server, and or an IoT device that is used to further monitor or manage attributes, activities, or other states associated with the various IoT devices. The supervisor device may be a standalone device, such as IoT device 102a, but could also be incorporated into another IoT device, such as IoT device 102j (e.g., a PC).

The supervisor device may include a user interface that can output information relating to the monitored attributes, activities, and/or other states associated with the IoT devices of system 100 (e.g., to another IoT device such as IoT device 102e or 102j) and receive input information therefrom to control or otherwise manage states associated therewith. Accordingly, the supervisor device may generally include various components and support various wired and wireless communication interfaces to observe, monitor, control, or otherwise manage the various components system 100. As such, it may be desirable for the supervisor device to support a wide variety of communications interfaces in order to centralize the management of a local environment. For example, IoT device 102a is capable of receiving and/or transmitting communications with other IoT devices over at least Ethernet, RF, ZigBee, and Bluetooth interfaces.

IoT devices 102 can include one or more passive IoT devices (in contrast to active IoT devices) that can be coupled to or otherwise be made part of system 100. Passive IoT devices may include barcoded devices, Bluetooth devices, radio frequency (RF) devices, RFID tagged devices, infrared (IR) devices, NFC tagged devices, or any other suitable device that can provide its identifier and potentially attributes to another device when queried over a short range interface. Active IoT devices may detect, store, communicate, act on, and/or the like, changes in attributes of passive IoT devices. Examples of passive IoT devices include a coffee cup and a television remote control that each has an RFID tag, barcode, and/or other passive communication interface. An active IoT device, such as a refrigerator, may be equipped with a scanner or reader that can read the RFID tag or barcode to detect when passive IoT devices have been added or removed therefrom, are within range of the active IoT device, and/or are otherwise associated with the IoT device. In response, a supervisor device may optionally receive one or more signals that relate to the activities detected at the IoT device. Although the foregoing describes passive IoT devices as having some form of RFID tag or barcode communication interface, these are merely examples.

In accordance with implementations of the present disclosure, environmental relationships between IoT devices 102 can be determined despite the IoT devices 120 potentially having a wide range of hardware configurations and capabilities. IoT devices 102 typically operate in the same environment (e.g., within a household). In accordance with the present disclosure, environmental detector 104 can associate, for example, IoT device 102e (e.g., a smartphone IoT device) and IoT device 102i (e.g., a gaming IoT device) with the same household so that information learned by system 100 about IoT device 102e can be leveraged in providing content to a user associated with IoT device 102i. As a particular example, system 100 could detect that a user recently watched a movie at a theater using GPS information from sensors on IoT device 102e and suggest a related movie to a different user or the same user using IoT device 102i based on determining that the two devices are associated with a common environment. Express knowledge of relationships or links between various user accounts is not needed for such personalization, as the environmental relationship between devices may be leveraged.

One or more of IoT devices 102 can include an ID aggregator. For example, IoT device 102a includes ID aggregator 110a. The ID aggregator 110a is configured to aggregate information regarding other IoT devices that are sensed by the IoT device 102a from the environment in which the IoT device 102a operates. The ID aggregator 110a can comprise, for example, executable code of an application or program on the IoT device 102. Each IoT device can include an ID aggregator similar to ID aggregator component 110a that acts to aggregate information regarding other IoT devices on behalf of the IoT device. The ID aggregators are configured to aggregate information in a consistent way across IoT devices, such that information that corresponds to the same environmental features can be matched to identify similarities between environments of different IoT devices.

Figure 2:
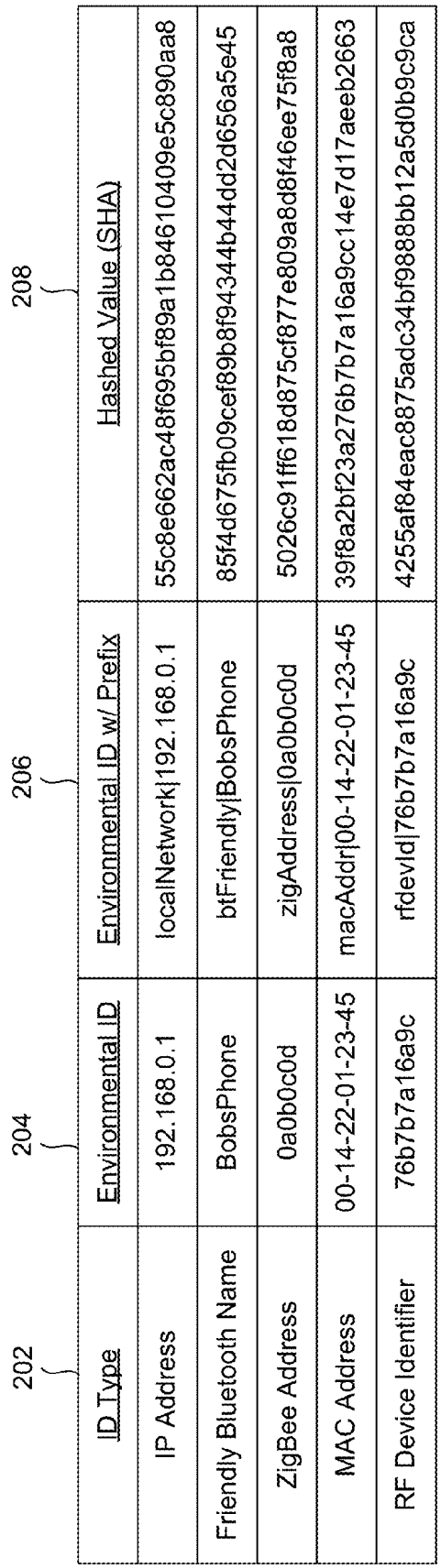
FIG. 2 is a diagram illustrating a table of aggregated environmental identifiers for an IOT device in accordance with implementations of the present disclosure.

FIG. 2 provides an example of a table 200 of environmental information about an IoT device that aggregated by an ID aggregator in accordance with implementations of the present disclosure. In particular, table 200 can correspond to IoT device 102a of FIGS. 1A and 1B. ID aggregator 110a aggregates environmental IDs 204 that are sensed by IoT device 102a. In the example shown, each environmental ID is a digital identifier of the environment, and more particularly device identifiers of IoT devices sensed by IoT device 102a.

One or more of the environmental IDs that are aggregated can comprise a device identifier of the IoT device performing the aggregation. For example, in the case that table 200 is aggregated by IoT device 102a, the MAC address shown in table 200 can be of IoT device 102a. One or more of the environmental IDs that are aggregated can also comprise a device identifier of an IoT device sensed by the IoT device performing the aggregation. For example, in table 200, the IP address can be of IoT device 102b, the friendly Bluetooth name can be of IoT device 102e, the ZigBee address can be of IoT device 102c, and the RF device identifier can be of IoT device 102d. In some implementations, device identifiers of sensed devices are extracted from one or more communications from the sensed device. For example, FIG. 1B shows various communication links between devices of system 100 including Bluetooth, GPS, Ethernet, RF, HDMI, ZigBee, and WiFi based interfaces. In the example of FIG. 2, the IP address can extracted from an Ethernet communication from IoT device 102b, the friendly Bluetooth name can be can extracted from a Bluetooth communication from IoT device 102e, the ZigBee address can extracted from a ZigBee communication from IoT device 102c, and the RF device identifier can extracted from an RF communication from IoT device 102d, by way of example. ID aggregator 110a may poll the various communication interfaces of IoT device 102a in order to aggregate these device IDs.

One or more of the environmental IDs that are aggregated can also comprise physical identifiers of the environment, such as sensory identifiers extracted by sensors of the IoT device performing the aggregation based on the physical environment of the IoT device. These can include GPS readings, temperature readings, images, videos, barometric pressure readings, and more. In the present example, IoT device 102a may not be equipped with a GPS sensor. However, IoT device 102e may be able to obtain such information (e.g., a Geolocation), for example, using GPS Satellite 121 and a GPS receiver. As another example, IoT device 102c can obtain a temperature reading from a temperature sensor therein. Further, IoT device 102d may obtain an image using a camera sensor therein.

Additionally environmental information stored in table 200 includes an identifier type 202 of each environmental ID and the environmental ID with prefix 206. The identifier type 202 provides an indication of the type of environmental identifier. For instance, the table 200 identifies environmental IDs corresponding with an IP address, friendly Bluetooth name, ZigBee address, MAC address, and RF device identifier. The environmental ID with prefix 206 comprises the environmental ID 204 with a prefix based on the identifier type 202.

One or more of IoT devices 102 can also include an ID translator. For example, referring again to FIG. 1a, IoT device 102a includes ID translator 110b. The ID translator 110b is configured to generate a hashed value computed over an environmental identifier. By way of example only and not limitation, a Secure Hash Algorithm is employed in some embodiments. However, it should be understood that other types of hash functions may be employed to generate a fingerprint in accordance with various embodiments of the present invention. The ID translator 110b can comprise, for example, executable code of an application or program on the IoT device 102. Each IoT device can include an ID translator similar to ID translator 110b that acts to generate hash values of environmental identifiers for each IoT device. The ID translators are configured to create hash values in a consistent way across IoT devices, such that information that corresponds to the same environmental features can be matched to identify similarities between environments of different IoT devices.

Referring again to FIG. 2, the table 200 includes hashed values 208. In some embodiments, the hashed values are generated using the environmental identifiers 204. In other embodiments, the hashed values are generated using the environmental identifiers with prefixes 206.

The environmental detector 104 operates to determine the environment of IoT devices, such as the IoT devices 102. A communication component 120 collects sets of fingerprints 128 from IoT devices. Each set of fingerprints corresponds with a particular IoT device. Additionally, each fingerprint in the set of fingerprints for an IoT device corresponds to an environmental identifier aggregated by the IoT device. In some configurations, the fingerprints comprise the environmental identifier. For instance, in the example provided by FIG. 2, IoT device 102a could provide the environmental identifiers 204 or the environmental identifiers with prefixes 206 as fingerprints. In other configurations, the fingerprints comprise hash values computed over environmental identifiers. For instance, in the example provided by FIG. 2, IoT device 102a could provide the hashed values 208 as fingerprints. Providing hash values instead of the actual environmental identifiers may be useful to, among other things, provide fingerprints that don't disclose personal information.

An environmental analyzer 124 computes similarity scores 124 between pairs of IoT devices. The environmental analyzer 124 employs a matching algorithm that generates a similarity score 124 between pairs of devices based on the set of fingerprints for the IoT devices. In one embodiment, a similarity score is generated by comparing the fingerprints for a first IoT device to the fingerprints of a second IoT device to determine the number and/or percentage of matching fingerprints. By way of example to illustrate, suppose, for instance, that a first IoT device has four fingerprints and a second IoT device has five fingerprints. Suppose further that three fingerprints match such that there are six unique fingerprints between the two IoT devices. Since three of the six fingerprints match, the pair of IoT devices would be provided a similarity score of 50 percent.

In some embodiments, the environmental analyzer 124 weights fingerprints based on specific identifier types. For example, fingerprints for GPS location and ZigBee addresses could be give greater weighting than fingerprints for more common environmental identifiers, such as local network IP addresses or Bluetooth device names. Such weighting can be used to account for different identifier types being better indicators that IoT devices should be grouped together. In further embodiments, the environmental analyzer 124 calculates the similarity score by weighting fingerprints based on the frequency and/or duration of time a sensed IoT device is in communication with the IoT device. This frequency-based or duration-based weighting accounts for the fact that some IoT devices may be more mobile and may connect with other IoT devices (e.g., WiFi hotspots) that should not be grouped together. In such cases, the frequency and/or duration of communications with such devices will be low causing a low weighting that will help weed out such sensed devices from being grouped together.

An environmental relationship identifier 126 identifies device groups 136 based on the similarity scores computed by the environmental analyzer 124. In some embodiments, devices that have a similarity score with a minimum score threshold are grouped together. For example, a minimum score threshold of a 50% match between fingerprints of two devices could be used. In the example of FIGS. 1A and 1B, the environmental relationship identifier 126 could group the IoT devices 102a-102k together. Based on the device groups, an account manager 124 maintains information identifying devices 134 corresponding with various users 132. In some instances, users 132 are identified with anonymous identifiers. In other instances, users 132 are identified with a user identifier that identifies a particular user or set of users (e.g., a household of users) if such a user identifier is available to the environmental detector 104.

Figure 3:
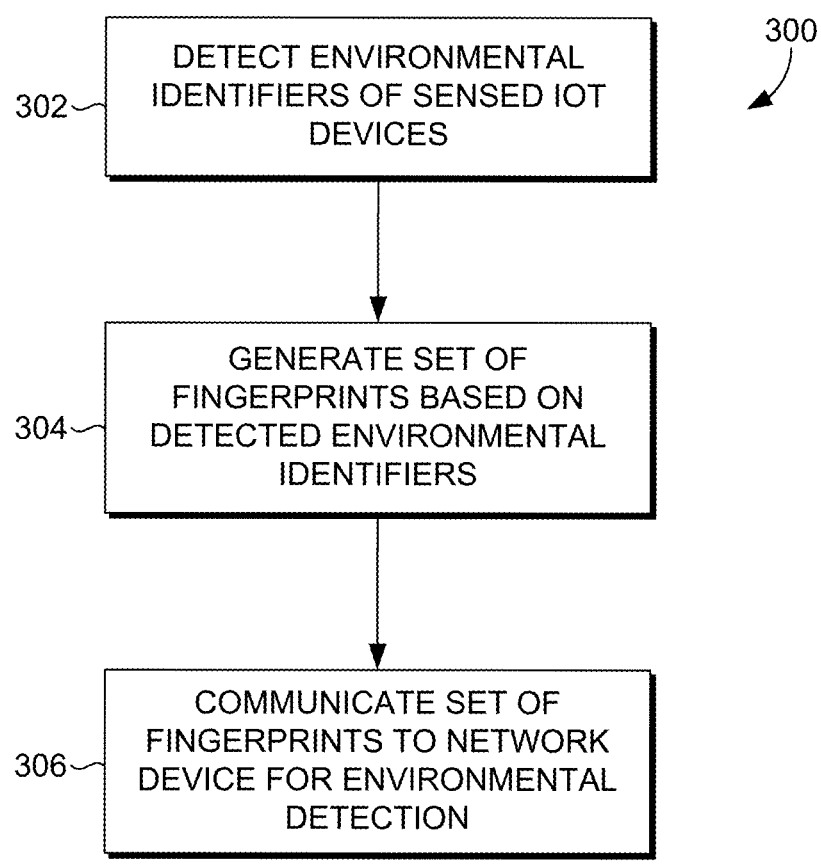
FIG. 3 is a flow diagram showing a method for providing a set of fingerprints for an IOT device in accordance with implementations of the present disclosure.

Referring to FIG. 3, a flow diagram is provided illustrating a method 300 for generating a set of fingerprints on an IoT device. Each block of method 300 and other methods described herein comprises a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few.

As shown at block 302, an IoT device detects an environmental identifier of each of a number of sensed IoT devices from one or more communications received by the IoT device from the sensed IoT devices. For instance, the IoT device may receive a communication from a smartphone via Bluetooth that includes the friendly Bluetooth name of the smartphone. As another example, the IoT device may detect the IP address of a router which communicates to the IoT device via WiFi. Any of a number of other environmental identifiers may be detected by the IoT device.

The IoT device generates a set of fingerprints based on the detected environmental identifiers, as shown at block 304. In some embodiments, each fingerprint comprises a corresponding environmental identifier. In other embodiments, each fingerprint comprises a hash value computed over a corresponding environmental identifier. For instance, a Secure Hash Algorithm may be employed to generate the hash value.

As shown at block 306, the set of fingerprints is communicated to a network device that operates to determine an environment of the IoT device. In some embodiments, an identifier type is provided for each of at least a portion of the fingerprints. For instance, if a fingerprint comprises a hash value from an IP address, an indication would be provided identifying the hash value as corresponding to an IP address. By providing identifier types with fingerprints, the network device may weight different fingerprints, as discussed in further detail herein.

Figure 4:
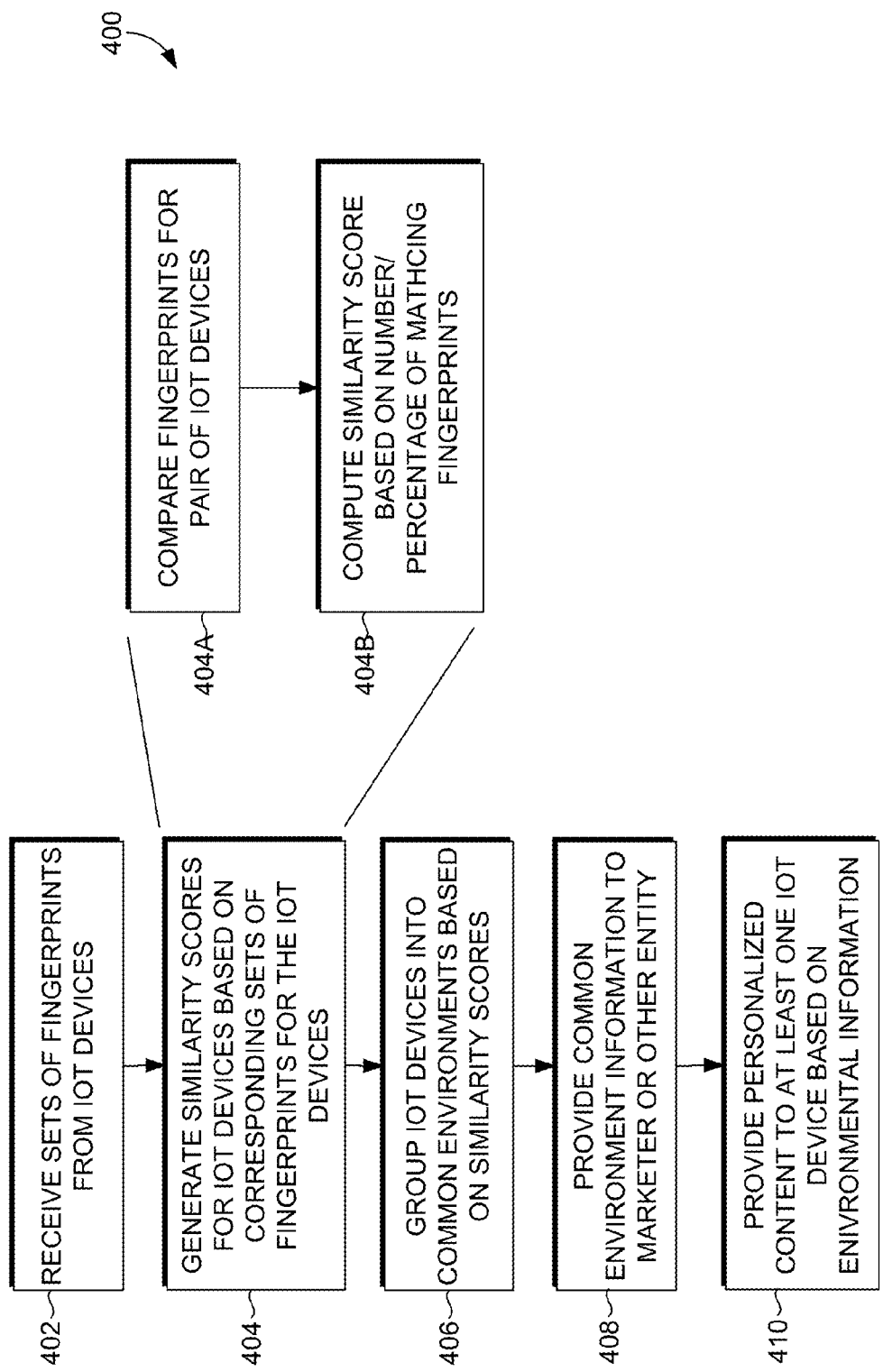
FIG. 4 is a flow diagram showing a method for determining an environment for IOT devices in accordance with implementations of the present disclosure.

Turning now to FIG. 4, a flow diagram is provided that illustrates a method 400 for identifying an environment of an IoT device. As shown at block 402, sets of fingerprints are received at a network device. Each set of fingerprints corresponds to a respective IoT device. Additionally, each of at least a portion of the fingerprints corresponds with a device identifier of a sensed device in communication with the respective IoT device. In some embodiments, other types of fingerprints are also received. For instance, a fingerprint may be received that corresponds to a device identifier of the respective IoT device itself. As another example, a fingerprint may be received that corresponds to an environmental identifier providing information regarding the physical environment of the IoT device (e.g., location, temperature, humidity, etc.).

Similarity scores are generated by comparing sets of fingerprints for pairs of IoT devices, as shown at block 404. In one embodiment, a similarity score is generated by comparing the fingerprints for a first IoT device to the fingerprints of a second IoT device to determine the number and/or percentage of matching fingerprints, as shown at block 404A. The similarity score for the pair of IoT devices therefore reflects the matching fingerprints between the sets of fingerprints for the two IoT devices, as shown at block 404B. In some embodiments, weightings are applied to at least some of the fingerprints based on identifier type associated with the fingerprints.

IoT devices are grouped into common environments based on similarity scores, as shown at block 406. This may include grouping two IoT devices together if the similarity score for the IoT devices satisfies a minimum threshold. Accordingly, each group of IoT devices can be generated based on pairs of devices within the group satisfying the minimum threshold.

In some embodiments, as shown at block 408, information regarding the common environment into which IoT devices are grouped is provided to a marketer or other entity. The information may include an indication of the grouped IoT devices. The information may further include physical environment information, such as location, to the extent such physical environment information is available. As such, the information may be used to improve the experience of the IoT devices. For instance, in some embodiments, as shown at block 410, personalized content is provided to at least one IoT device based on the environmental information. By way of example to illustrate, two common environments could be "household" and "work." The marketer could then use this generic identifier to influence the marketing campaigns shown in that given environment on a given device. For instance, rules could be established that dictate: "if the target consumer is at home, show advertisements related to household goods; if the target consumer is at work, show advertisements related to vacation spots."

Figure 5:
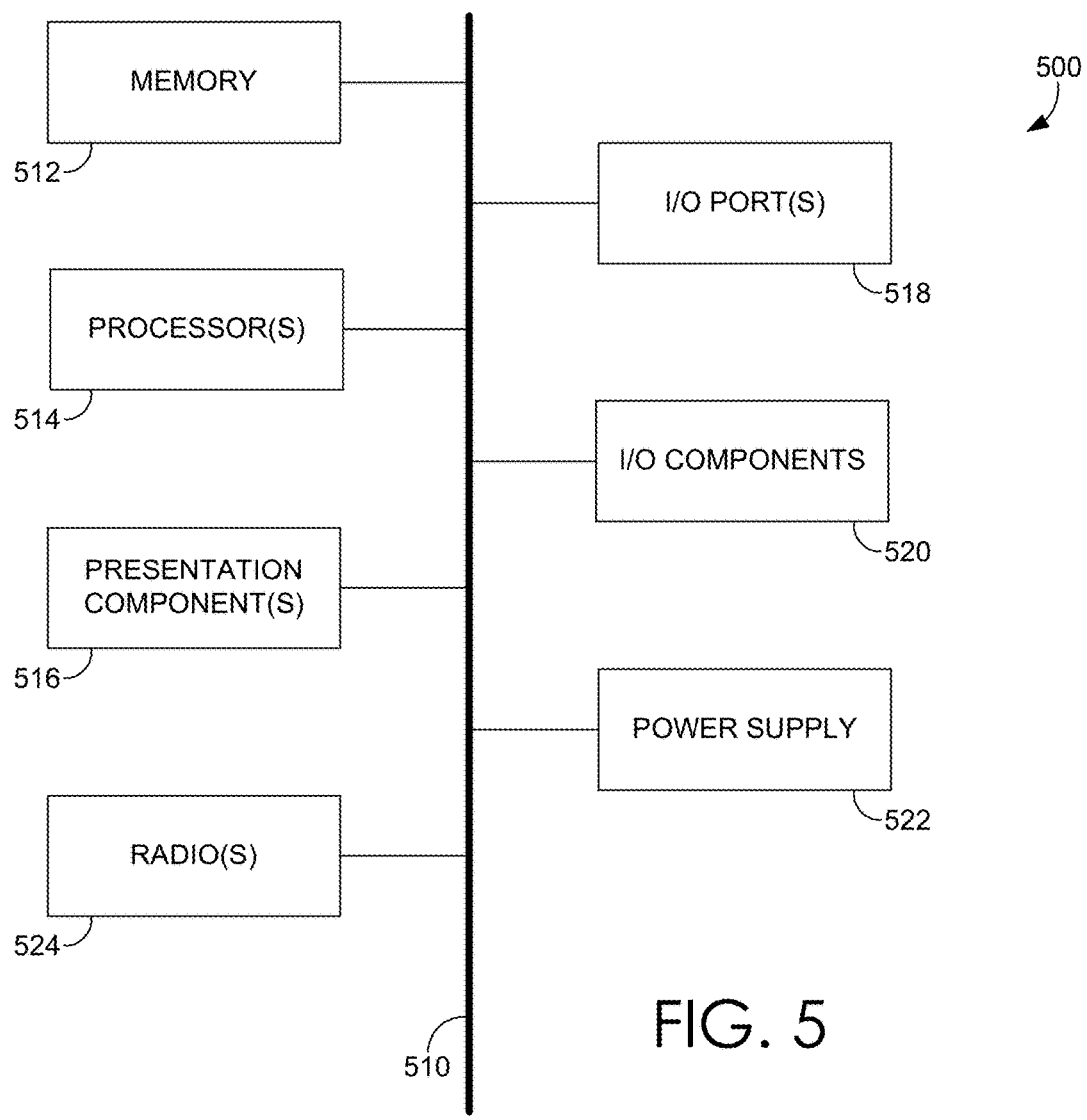
FIG. 5 is a block diagram of an exemplary computing environment suitable for use in implementations of the present disclosure.

Having described implementations of the present disclosure, an exemplary operating environment in which embodiments of the present invention may be implemented is described below in order to provide a general context for various aspects of the present disclosure. Referring initially to FIG. 5 in particular, an exemplary operating environment for implementing embodiments of the present invention is shown and designated generally as computing device 500. Computing device 500 is but one example of a suitable computing environment and is not intended to suggest any limitation as to the scope of use or functionality of the invention. Neither should the computing device 500 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 5, computing device 500 includes bus 510 that directly or indirectly couples the following devices: memory 512, one or more processors 514, one or more presentation components 516, input/output (I/O) ports 518, input/output components 520, and illustrative power supply 522. Bus 510 represents what may be one or more busses (such as an address bus, data bus, or combination thereof). Although the various blocks of FIG. 5 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors recognize that such is the nature of the art, and reiterate that the diagram of FIG. 5 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 5 and reference to "computing device."

Computing device 500 typically includes a variety of computer-readable media. Computer-readable media can be any available media that can be accessed by computing device 500 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 500. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 512 includes computer-storage media in the form of volatile and/or nonvolatile memory. The memory may be removable, non-removable, or a combination thereof. Exemplary hardware devices include solid-state memory, hard drives, optical-disc drives, etc. Computing device 500 includes one or more processors that read data from various entities such as memory 512 or I/O components 520. Presentation component(s) 516 present data indications to a user or other device. Exemplary presentation components include a display device, speaker, printing component, vibrating component, etc.

I/O ports 518 allow computing device 500 to be logically coupled to other devices including I/O components 520, some of which may be built in. Illustrative components include a microphone, joystick, game pad, satellite dish, scanner, printer, wireless device, etc. The I/O components 520 may provide a natural user interface (NUI) that processes air gestures, voice, or other physiological inputs generated by a user. In some instance, inputs may be transmitted to an appropriate network element for further processing. A NUI may implement any combination of speech recognition, touch and stylus recognition, facial recognition, biometric recognition, gesture recognition both on screen and adjacent to the screen, air gestures, head and eye-tracking, and touch recognition associated with displays on the computing device 500. The computing device 500 may be equipped with depth cameras, such as, stereoscopic camera systems, infrared camera systems, RGB camera systems, and combinations of these for gesture detection and recognition. Additionally, the computing device 500 may be equipped with accelerometers or gyroscopes that enable detection of motion.

As described above, implementations of the present disclosure relate to determining environmental information for IoT devices. The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. A computer-implemented method comprising:
receiving sets of fingerprints, each set of fingerprints being assigned to a respective IoT (Internet of Things) device and containing at least one fingerprint of a sensed IoT device separate from and in external communication with the respective IoT device, the set of fingerprints including a first set of fingerprints assigned to a first IoT device that contains a corresponding fingerprint of each sensed IoT device from a first plurality of sensed IoT devices separate from and in external communication with the first IoT device, the set of fingerprints further including a second set of fingerprints assigned to a second IoT device that contains a corresponding fingerprint of each sensed IoT device from a second plurality of sensed IoT devices separate from and in external communication with the second IoT device;
generating, via one or more processors, a similarity score for the first IoT device and the second IoT device by comparing the first set of fingerprints assigned to the first IoT device to the second set of fingerprints assigned to the second IoT device to identify matching fingerprints between the first set and the second set;
grouping the first IoT device and the second IoT device into a common environment based on the similarity score; and
providing content over one or more communications networks to a user associated with the first IoT device based on the first IoT device being grouped into the common environment with the second IoT device.

2. The method of claim 1, wherein the first set of fingerprints assigned to the first IoT device includes a fingerprint corresponding to an environmental identifier representative of a physical environment of the first IoT device.

3. The method of claim 1, wherein the first set of fingerprints assigned to the first IoT device includes a fingerprint corresponding to a device identifier of the first IoT device.

4. The method of claim 1, wherein each fingerprint corresponding to a respective sensed IoT device comprises a hashed value determined by applying a hash algorithm to a device identifier of the respective sensed IoT device.

5. The method of claim 4, wherein the hash algorithm comprises a Secure Hash Algorithm (SHA).

6. The method of claim 1, wherein receiving the sets of fingerprints comprises:
receiving, over one or more communication networks, the first set of fingerprints from the first IoT device; and
receiving, over the one or more communications networks, the second set of fingerprints from the second IoT device.

7. The method of claim 1, wherein generating the similarity score for the first IoT device and the second IoT device includes weighting at least one fingerprint from the first set and the second set based on an identifier type associated with the at least one fingerprint.

8. The method of claim 1, wherein the method further comprises providing information regarding the first IoT device and the second IoT device being grouped into the common environment to one or more entities.

9. The method of claim 1, wherein the first IoT device and the second IoT device are grouped into the common environment based on the similarity score satisfying a threshold score.

10. One or more computer storage media storing computer-useable instructions that, when executed by a computing device, perform operations, the operations comprising:
receiving a first set of fingerprints assigned to a first IoT device over one or more network communications, at least one fingerprint from the first set of fingerprints corresponding to a hashed identifier of a sensed IoT device separate from the first IoT device, the hashed identified having been received by the first IoT device from one or more external communications between the first IoT device and the sensed IoT device;
comparing the first set of fingerprints assigned to the first IoT device to a second set of fingerprints assigned to a second IoT device to identify matching fingerprints between the first set and the second set, at least one fingerprint from the second set of fingerprints corresponding to the hashed identifier of the sensed IoT device from one or more external communications received by the second IoT device from the sensed IoT device; and grouping the first IoT device and the second IoT device into a common environment based on the matching fingerprints between the first set and the second set.

11. The one or more computer storage media of claim 10, wherein the first set of fingerprints assigned to the first IoT device includes a fingerprint corresponding to an environmental identifier representative of a physical environment of the first IoT device.

12. The one or more computer storage media of claim 10, wherein the first set of fingerprints assigned to the first IoT device includes a fingerprint corresponding to a device identifier of the first IoT device.

13. The one or more computer storage media of claim 10, wherein comparing the first set of fingerprints assigned to the first IoT device to the second set of fingerprints assigned to the second IoT device includes generating a similarity score for the first IoT device and the second IoT device based on the matching fingerprints.

14. The one or more computer storage media of claim 13, wherein generating the similarity score includes weighting at least one fingerprint from the first set and the second set based on an identifier type associated with the at least one fingerprint.

15. The one or more computer storage media of claim 13, wherein the first IoT device and the second IoT device are grouped into the common environment based on the similarity score satisfying a threshold score.

16. The one or more computer storage media of claim 10, wherein the operations further comprise providing content to a user associated with the first IoT device based on the first IoT device being grouped into the common environment with the second IoT device.

17. A computer-implemented system comprising:
one or more processors; and
one or more computer storage media storing computer useable instructions to cause the one or more processors to:
receive sets of fingerprints over network communications, each set of fingerprints assigned to a respective IoT device and at least one fingerprint in each set corresponding to a hashed identifier of a sensed IoT device separate from the respective IoT device, the hashed identified having been extracted from one or more external communications from the sensed IoT device received by the respective IoT device;
calculate similarity scores for pairs of IoT devices, the similarity score between each pair of IoT devices being calculated based on identifying matching fingerprints between the sets of fingerprints assigned to the IoT devices in the pair; and
group the IoT devices into common environments based on the similarity scores.

18. The system of claim 17, wherein a first set of fingerprints assigned to a first IoT device further includes a fingerprint corresponding to an environmental identifier representative of a physical environment of the first IoT device and a fingerprint corresponding to a device identifier of the first IoT device.

19. The system of claim 17, wherein the similarity scores are calculated by weighting at least one fingerprint.

20. The system of claim 17, wherein the computer useable instructions further cause the one or more processors to personalize content for users, the content for a first of the users associated with a primary IoT device being personalized based on detecting a related IoT device associated with a second user and based on the related IoT device being grouped into a common environment of the common environments with the primary IoT device.

* * * * *